United States Patent Office 3,007,925
Patented Nov. 7, 1961

3,007,925
9α-HALO AND 9β,11β-EPOXY STEROIDS OF THE PREGNANE SERIES AND PROCESSES FOR PREPARING THE SAME
Josef Fried and Josef E. Herz, New Brunswick, N.J., assignors to Olin Mathieson Chemical Corporation, New York, N.Y., a corporation of Virginia
No Drawing. Filed Oct. 19, 1956, Ser. No. 616,944
16 Claims. (Cl. 260—239.55)

This application is a continuation-in-part of our patent application, Serial No. 585,155, filed May 16, 1956.

This invention relates to the synthesis of valuable steroids and has for its objects the provision of: (I) an advantageous process of preparing steroids of the $\Delta^{4,13}$-18-nor-17α-pregnadiene (including the 18-nor-17α-pregnatrienes) series having a 9α-halo substituent, and an 11-keto, 11β-hydroxy or 11β-acyloxy substituent; (II) certain new compounds useful themselves as physiologically active steroids; and (III) certain new compounds useful in the preparation of said physiologically active steroids.

The process of this invention essentially comprises: (a) interacting a 21-organic sulfonic acid ester of 9β,11β-epoxy - $\Delta^4$ - pregnene-17a,21-diol-3,20-dione or 9β,11β-epoxy-$\Delta^{1,4}$-pregnadiene-17α,21-diol-3,20-dione with anhydrous potassium fluoride to yield, inter alia, $\Delta^4$-pregnene-9β,11β;17α,21-dioxido-3,20-dione and $\Delta^{1,14}$-pregnadiene-9β,11β;17α,21-dioxido-3,20-dione, respectively; (b) treating the latter compounds with a hydrogen halide to yield the corresponding 9α-halo-11β-hydroxy derivatives; (c) oxidizing these 9α-halo-11β-hydroxy derivatives, if desired, to the corresponding 9α - halo - 11 - keto derivatives; (d) rearranging the 9α-halo-11β-hydroxy derivatives, either by heating with a dilute acid or by treating with hydrogen fluoride, to the corresponding 9α-halo-$\Delta^4$-17β - methyl-17α-pregnene-13α,21-oxido-11β-ol-3,20-dione or 9α-halo-$\Delta^{1,4}$-17β-methyl-18-nor-17α-pregnadiene - 13α, 21-oxido-11β-ol-3,20-dione derivatives, respectively; (e) oxidizing these 11β-hydroxy steroids, if desired, to the corresponding 11-ketones; and (f) treating the 11β-hydroxy norpregnanes with hydrogen fluoride to yield 9α-halo-$\Delta^{4,13}$-17β-methyl-17α-pregnadiene-11β,21-diol - 3,20-dione or 9α-halo-$\Delta^{1,4,13}$-17β-methyl-17α-pregnatriene-11β, 21-diol-3,20-dione, respectively, which in turn can in the usual manner be oxidized to their 11-keto derivatives (after protection of the 21-hydroxyl group by monoacetylation), monoesterified to yield a 21-monoester, or diesterified (if an 11β-hydroxy starting material is used) to yield an 11β,21-diester derivative. The 9α-fluoro-$\Delta^4$-pregnene-17a,21-oxido-11β-ol-3,20-dione and 9α-fluoro-$\Delta^{1,4}$-pregnadiene - 17α,21 - oxido-11β-ol-3,20-dione derivatives of this invention can also be prepared directly from 21-organic sulfonic acid esters of 9α-fluorohydrocortisone or 9α-fluoro-$\Delta^{1,4}$-pregnadiene-11β,17α,21-triol-3,20-dione, as disclosed in said Serial No. 585,155, by interaction of the sulfonic acid esters with potassium fluoride. The final $\Delta^{13}$-steroids can also be prepared directly from the 17α, 21-epoxide derivatives, without isolation of the rearranged intermediates, by treating the latter with hydrogen fluoride.

The novel compounds of this invention comprise: (A) intermediate steroids of the general formula

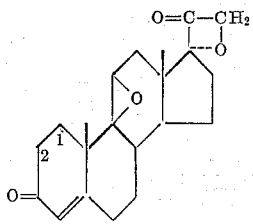

wherein the 1,2-position is saturated or double-bonded;

(B) intermediate 9α-halo steroids, which possess glucocorticoid activity and hence can be used in lieu of hydrocortisone in the treatment of rheumatoid arthritis, of the general formula

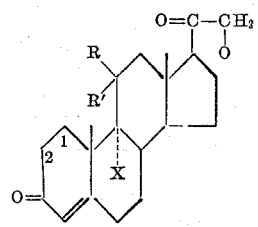

wherein the 1,2-position is saturated or double-bonded, R is hydrogen, R' is β-hydroxy, or together R and R' is keto, and X is α-halogen (preferably fluoro); (C) intermediate 9α-halo-17α-pregnenes of the general formula

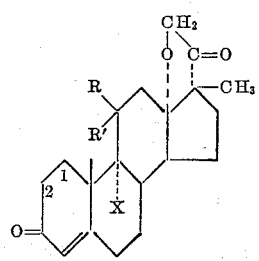

wherein the 1,2-position is saturated or double-bonded and R, R' and X are as above defined; and (D) the final products of this invention, which have utility both as mineralocorticoids (and hence may be used instead of desoxycorticosterone acetate in the treatment of Addison's disease) and as androgens (and hence may be used instead of methyltestosterone in the treatment of gonadal failure in males or instead of testosterone propionate in the treatment of menopausal disturbances in females), of the general formula

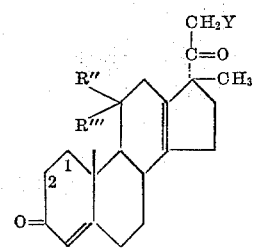

wherein the 1,2-position is saturated or double-bonded, R" is hydrogen, R''' is β-hydroxy or β-acyloxy, or together R" and R''' is keto, X is α-halogen (preferably fluoro), and Y is hydroxy or acyloxy. In both instances, the acyloxy substituent is preferably the acyloxy radical of a hydrocarbon carboxylic acid having less than ten carbon atoms, as exemplified by the lower alkanoic acids (e.g., acetic acid), the lower alkanoic acids (e.g., acrylic acid), the monocyclic aromatic carboxylic acids (e.g., benzoic acid), the monocyclic aromatic lower alkanoic acids (e.g., phenacetic acid), the cyclo(lower alkyl)carboxylic acids (e.g., cyclopropanecarboxylic acid) and the cyclo(lower alkenyl)carboxylic acids (e.g., cyclohexenecarboxyl acid).

The process of this invention can be illustrated by the following equations:

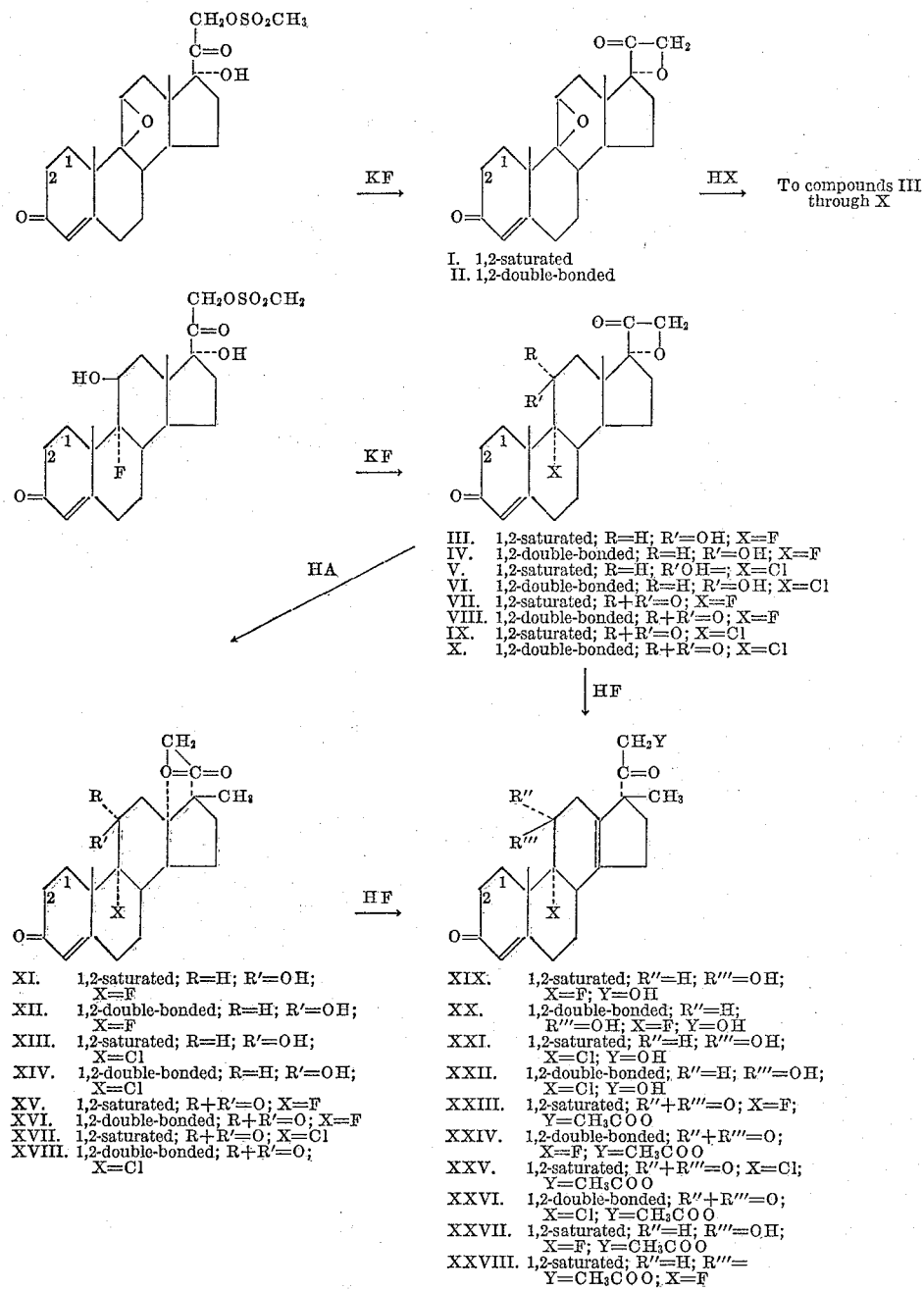

III. 1,2-saturated; R=H; R'=OH; X=F
IV. 1,2-double-bonded; R=H; R'=OH; X=F
V. 1,2-saturated; R=H; R'OH=; X=Cl
VI. 1,2-double-bonded; R=H; R'=OH; X=Cl
VII. 1,2-saturated; R+R'=O; X=F
VIII. 1,2-double-bonded; R+R'=O; X=F
IX. 1,2-saturated; R+R'=O; X=Cl
X. 1,2-double-bonded; R+R'=O; X=Cl XI. 1,2-saturated; R=H; R'=OH; X=F
XII. 1,2-double-bonded; R=H; R'=OH; X=F
XIII. 1,2-saturated; R=H; R'=OH; X=Cl
XIV. 1,2-double-bonded; R=H; R'=OH; X=Cl
XV. 1,2-saturated; R+R'=O; X=F
XVI. 1,2-double-bonded; R+R'=O; X=F
XVII. 1,2-saturated; R+R'=O; X=Cl
XVIII. 1,2-double-bonded; R+R'=O; X=Cl XIX. 1,2-saturated; R''=H; R'''=OH; X=F; Y=OH
XX. 1,2-double-bonded; R''=H; R'''=OH; X=F; Y=OH
XXI. 1,2-saturated; R''=H; R'''=OH; X=Cl; Y=OH
XXII. 1,2-double-bonded; R''=H; R'''=OH; X=Cl; Y=OH
XXIII. 1,2-saturated; R''+R'''=O; X=F; Y=CH$_3$COO
XXIV. 1,2-double-bonded; R''+R'''=O; X=F; Y=CH$_3$COO
XXV. 1,2-saturated; R''+R'''=O; X=Cl; Y=CH$_3$COO
XXVI. 1,2-double-bonded; R''+R'''=O; X=Cl; Y=CH$_3$COO
XXVII. 1,2-saturated; R''=H; R'''=OH; X=F; Y=CH$_3$COO
XXVIII. 1,2-saturated; R''=H; R'''=Y=CH$_3$COO; X=F To prepare the diepoxides of this invention (Compounds I and II), a 21-organic sulfonic acid ester of $9\beta,11\beta$ - epoxy-$\Delta^4$-pregnene-$17\alpha,21$-diol-3,20-dione or $9\beta,11\beta$ - epoxy-$\Delta^{1,4}$-pregnadiene-$17\alpha,21$-diol-3,20-dione e.g., a lower alkanesulfonate, such as mesylate, and an aryl sulfonate, such as tosylate) is reacted with potassium fluoride. This reaction is preferably conducted under substantially anhydrous conditions in an organic solvent of high dielectric constant, such as dimethylformamide, dimethylsulfoxide or diethylene glycol, optimally at an elevated temperature (e.g., 90–120° C.). This process also affords a direct method for preparing $9\alpha$-fluoro-$\Delta^4$-pregnene-$17\alpha,21$-oxido-$11\beta$-ol-3,20-dione (Compound III) and $9\alpha$-fluoro-$\Delta^{1,4}$-pregnadiene-$17\alpha,21$-oxido-$11\beta$-ol-3,20-dione (Compound IV) from the organic sulfonic acid esters (e.g., mesylates) of $9\alpha$-fluorohydrocortisone and $9\alpha$-fluoro-$\Delta^{1,4}$-pregnadiene-$11\beta,17\alpha,21$-triol-3,20-dione, respectively.

To prepare the other $9\alpha$-halo-$\Delta^4$-pregnene-(or $\Delta^{1,4}$-pregnadiene)-$17\alpha,21$-oxido-$11\beta$-ol-3,20-diones of this invention, Compound I or Compound II is interacted with a hydrogen halide (e.g., hydrogen chloride, hydrogen bromide and hydrogen iodide) in the usual manner to yield the corresponding $9\alpha$-halo-$11\beta$-hydroxy derivative (as exemplified by Compounds V and VI). The $9\alpha$-halo-$11\beta$-hydroxy steroids, thus formed, can then be oxidized by reaction with a hexavalent chromium compound (e.g., chromic acid) to yield the corresponding $9\alpha$-halo-11-keto derivatives (as exemplified by Compounds VII through X).

The $9\alpha$-halo-$11\beta$-hydroxy steroids (e.g., Compounds III through VI) can then be rearranged to the 17α-pregnene (or pregnadiene) derivatives by either heating with a dilute acid (HA), such as dilute mineral acid as exemplified by dilute sulfuric acid, the heating being preferably done in the temperature range of about 60° C. to about 100° C., or by treatment with hydrogen fluoride in an organic solvent at a low temperature (e.g., below room temperature) for a short period of time (e.g., about 30 minutes).

The reaction results in the formation of a 9α-halo-$\Delta^4$- (or $\Delta^{1,4}$)-17β-methyl-17α-pregnene-(or pregnadiene)-13α, 21-oxido-11β-ol-3,20-dione (e.g., Compounds XI through XIV), which can be oxidized in the usual manner to the 11-keto derivatives (e.g., Compounds XV through XVIII) or treated with hydrogen fluoride for more than thirty minutes to yield the 9α-halo-$\Delta^{4,13}$-(or $\Delta^{1,4,13}$-17β-methyl-17α-pregnadiene-(or pregnatriene)-11β,21-diol-3,20-dione final products of this invention (e.g., Compounds XIX through XXII). If an 11-keto steroid is desired, the initially resulting 11β-hydroxy steroid can be oxidized with chromic acid (after protection of the 21-hydroxyl group as by monoacetylation to the ketones, e.g., Compounds XXIII through XXVI), which in turn can be saponified in the usual manner, as by treatment with potassium carbonate, to yield the free 11-keto-21-hydroxy derivatives. To prepare 21-esters, the 11β-hydroxy steroids are reacted with an acylating agent, such as an acid anhydride or an acyl halide (e.g., acetic anhydride or benzoyl chloride), in the presence of a tertiary base (e.g., pyridine). The nature of the ester derivative will depend on the mole ratio of esterifying reagent to steroid. If a one to one mole ratio is used, then a 21-monoester is formed; if, however, two or more moles of acylating agent is employed per mole of steroid, then an 11β,21-diester is the product.

The $\Delta^{13}$-steroids can also be formed directly from the 17α,21-epoxy steroids (without separation of the initial rearranged intermediate) by treating the latter with hydrogen fluoride for more than thirty minutes.

The following examples illustrate the invention (all temperatures being in centigrade):

EXAMPLE 1

$\Delta^4$-pregnene-9β,11β;17α,21-dioxido-3,20-dione (I)

1.0 g. of 9β,11β-epoxy-$\Delta^4$-pregnene-17α,21-diol-3,20-dione 21-mesylate and 1.0 g. of anhydrous potassium fluoride are heated in 50 ml. of freshly distilled dimethylsulfoxide with stirring at 110° for 18 hours. The mixture is concentrated in vacuo, the residue (10 ml.) taken up in ethyl acetate and the ethyl acetate extract washed with water, dried over sodium sulfate and evaporated to dryness in vacuo. The semicrystalline residue (about 770 mg.) is treated with 20 ml. of benzene, the resulting suspension centrifuged and the benzene solution chromatographed on 15 g. of acid-washed alumina. Elution with benzene (1000 ml.) produces about 115 mg. of crystalline $\Delta^4$-pregnene-9β,11β;17α,21-dioxido-3,20-dione, which after recrystallization from 95% alcohol has the following properties: M.P. about 196–199°; $[\alpha]_D^{23}$+59° (c., 1.02 in chloroform);

$\lambda_{max.}^{alc.}$ 243 mμ (ε=16,200); $\lambda_{max.}^{Nujol}$ no OH; 5.52μ 6.0μ 6.17μ

Analysis.—Calcd. for $C_{21}H_{26}O_4$ (342.42): C, 73.66; H, 7.66. Found: C, 73.62; H, 7.77.

The above-mentioned precipitate obtained after removal of the benzene-soluble 17α,21-epoxide (I) by centrifugation is recrystallized from acetone-hexane and furnishes 21–fluoro-$\Delta^4$-pregnene-9β,11β - oxido - 17α - ol-3,20-dione of the following properties: M.P. about 245–246°; $[\alpha]_D^{23}$—11.5° (c., 0.37 in acetone);

$\lambda_{max.}^{alc.}$ 243mμ (ε=15,500); $\lambda_{max.}^{Nujol}$ 2.87μ, 5.80μ, 6.10μ

Analysis.—Calcd. for $C_{21}H_{27}O_4F$ (362.43): C, 69.59; H, 7.51; F, 5.24. Found: C, 69.50; H, 7.63; F, 5.26.

EXAMPLE 2

$\Delta^{1,4}$-pregnadiene-9β,11β;17α,21-dioxido-3,20-dione (II)

Following the procedure of Example 1, but substituting 9β,11β-epoxy-$\Delta^{1,4}$-pregnadiene-17α,21 - diol - 3,20 - dione 21-mesylate for the mesylate of the example, there is obtained $\Delta^{1,4}$-pregnadiene-9β,11β;17α,21 - dioxido - 3,20-dione (II) and 21-fluoro-$\Delta^{1,4}$-pregnadiene-9β,11β - oxido-17α-ol-3,20-dione.

EXAMPLE 3

9α-fluoro-$\Delta^4$-pregnene-17α,21-oxido-11β-ol-3,20-dione (III)

To a solution of 200 mg. of 9α-fluorohydrocortisone 21-mesylate in 5 ml. of redistilled dimethylformamide is added 200 ml. of anhydrous potassium fluoride, and the resulting suspension is heated with stirring at 110° for 18 hours. The mixture is concentrated to small volume, taken up in water and extracted with ethyl acetate. The ethyl acetate extract is in turn extracted with water, dried over sodium sulfate and the solvent removed in vacuo. The residue is triturated with chloroform, and the chloroform solution, from which the insoluble 9α,21-difluoro-$\Delta^4$-pregene-11β,17α-diol-3,20-dione concurrently formed has been removed, is concentrated in vacuo. The residue obtained is recrystallized from 95% ethanol to yield 9α-fluoro-$\Delta^4$-pregnene-17α,21-oxido - 11β - ol - 3,20 - dione having the following properties: M.P. about 272–274°; $[\alpha]_D^{23}$+186° (c., 0.57 in chloroform);

$\lambda_{max.}^{alc.}$ 2.37 mμ (ε=18,300); $\lambda_{max.}^{Nujol}$ 3.00μ, 5.55μ, 6.05μ, 6.10μ 6.19μ

Analysis.—Calcd. for $C_{21}H_{27}O_4F$ (362.43): C, 69.61; H, 7.51; F, 5.37. Found: C, 69.77; H, 7.77; F, 5.65.

EXAMPLE 4

9α-fluoro-$\Delta^{1,4}$-pregnadiene-17α,21-oxido-11β-ol-3,20-dione (IV)

To a solution of 217 mg. of 9α-fluoro-$\Delta^{1,4}$-pregnadiene-11β,17α,21-triol-3,20-dione 21-mesylate in 10 ml. of dimethylformamide is added 220 mg. of anhydrous potassium fluoride. The reaction conditions are the same as in Example 3. The residue from the ethyl acetate extract is triturated with chloroform, and the chloroform filtrate, after separating off the insoluble 9α,21-difluoro-$\Delta^{1,4}$-pregnadiene-11β,17α-diol-3,20-dione, is evaporated in vacuo to leave a residue which is recrystallized from 95% ethanol to yield 9α-fluoro-$\Delta^{1,4}$-pregnadiene-17α,21-oxido-11β-ol-3,20-dione having the following properties: M.P. about 227–228°; $[\alpha]_D^{23}$+181° (c., 0.47 in chloroform);

$\lambda_{max.}^{Nujol}$ 2.95μ, 5.52μ, 6.04μ, 6.17μ, 6.24μ

EXAMPLE 5

9α-fluoro-$\Delta^{1,4}$-pregnadiene-17α,21-oxido-11β-ol-3,20-dione (IV)

To a solution of 770 mg. of 9α-fluoro-$\Delta^{1,4}$-pregnadiene-11β-17α,21-triol-3,20-dione 21-mesylate in 33 ml. of dimethylsulfoxide is added 770 mg. of anhydrous potassium fluoride. The reaction conditions are the same as in Example 3. The residue from the ethyl acetate extract is triturated with chloroform and the chloroform filtrate, after separating off the insoluble 9α,21-difluoro-$\Delta^{1,4}$-pregnadiene-11β,17α-diol-3,20-dione, is evaporated in vacuo to leave a residue (about 350 mg.) which is dissolved in 20 ml. of chloroform and 20 ml. of benzene and chromatographed on 7 g. of acid-washed alumina. Elution with 500 ml. of chloroform-benzene (1:1) furnishes about 220 mg. of crystalline material, which after recrystallization from 95% ethanol yields 9α-fluoro-$\Delta^{1,4}$-pregnadiene-17α,21-oxido-11β-ol-3,20 - dione having the following properties: M.P. about 308–310°; $[\alpha]_D^{23}$+183° (c., 0.47 in chloroform);

$\lambda_{max.}^{Nujol}$ 2.93μ, 5.52μ, 6.03μ, 6.16μ, 6.23μ; $\lambda_{max.}^{alc.}$ 237 mμ (ε=17,200)

*Analysis.*—Calcd. for $C_{21}H_{25}O_4F$ (360.41): C, 69.98; H, 6.99. Found: C, 69.85; H, 6.96.

EXAMPLE 6

*9α-chloro-Δ⁴-pregnene-17α,21-oxido-11β-ol-3,20-dione (V)*

To a solution of 500 mg. of Δ⁴-pregnene-9β,11β;17α,21-dioxido-3,20-dione in 50 ml. of chloroform is added at 0° 7.5 ml. of 0.57 N hydrogen chloride in chloroform. The mixture is allowed to remain at 0° for one hour and then extracted with water, dilute sodium bicarbonate and again with water. The chloroform solution is dried over sodium sulfate and the solvent removed in vacuo. The residue, after crystallization from 95% alcohol, furnishes pure 9α-chloro-Δ⁴-pregnene-17α,21-oxido-11β-ol-3,20-dione (V).

In a similar manner, if hydrogen bromide or hydrogen iodide is substituted for the hydrogen chloride in the procedure of Example 6, there is obtained 9α-bromo-Δ⁴-pregnene-17α,21-oxido-11β-ol-3,20-dione and 9α-iodo-Δ⁴-pregnene-17α,21-oxido-11β-ol-3,20-dione, respectively.

EXAMPLE 7

*9α-chloro-Δ¹,⁴-pregnadiene-17α,21-oxido-11β-ol-3,20-dione (VI)*

Following the procedure of Example 6, but substituting an equivalent amount of Δ¹,⁴-pregnadiene-9β,11β;17α,21-dioxido-3,20-dione for the Δ⁴-pregnene-9β,11β;17α,21-dioxido-3,20-dione, there is obtained 9α-chloro-Δ¹,⁴-pregnadiene-17α,21-oxido-11β-ol-3,20-dione (VI).

EXAMPLE 8

*9α-fluoro-Δ⁴-pregnene-17α,21-oxido-3,11,20-trione (VII)*

To a solution of 100 mg. of 9α-fluoro-Δ⁴-pregnene-17α,21-oxido-11β-ol-3,20-dione in 5 ml. of glacial acetic acid is added a solution of 35 mg. of chromic acid in 3.5 ml. of glacial acetic acid. The mixture is allowed to remain at room temperature for 30 minutes; and after addition of 0.5 ml. of alcohol, the solution is concentrated to a small volume in vacuo. The concentrate is extracted with chloroform, and the chloroform extract is washed with water, dilute bicarbonate and again with water, dried over sodium sulfate, and the solvent removed in vacuo. The resulting 9α-fluoro-Δ⁴-pregnene-17α,21-oxido-3,11,20-trione is recrystallized from acetone.

Similarly, by substituting an equivalent amount of 9α-fluoro-Δ¹,⁴-pregnadiene-17α,21-oxido-11β-ol-3,20-dione, 9α-chloro-Δ⁴-pregnene-17α,21-oxido-11β-ol-3,20-dione and 9α-chloro-Δ¹,⁴-pregnadiene-17α,21-oxido-11β-ol-3,20-dione for the 9α-fluoro-Δ⁴-pregnene-17α,21-oxido-11β,ol-3,20-dione in the procedure of Example 8, there is obtained 9α-fluoro-Δ¹,⁴-pregnadiene-17α,21-oxido-3,11,20-trione (VIII), 9α-chloro-Δ⁴-pregnene-17α,21-oxido-3,11,20-trione (IX) and 9α-chloro-Δ¹,⁴-pregnadiene-17α,21-oxido-3,11,20-trione (X), respectively.

EXAMPLE 9

*9α-fluoro-Δ⁴-17β-methyl-17α-pregnene-13α,21-oxido-11β-ol-3,20-dione (XI)*

A solution of 100 mg. of 9α-fluoro-Δ⁴-pregnene-17α,21-oxido-11β-ol-3,20-dione in 20 ml. methanol and 0.64 ml. of 8½% aqueous sulfuric acid is refluxed for 1.5 hours. After neutralization with sodium bicarbonate, the methanol is removed in vacuo, the resulting suspension extracted with chloroform, the chloroform extract dried over sodium sulfate and the solvent removed in vacuo. The resulting residue is recrystallized from acetone-hexane and represents pure 9α-fluoro-Δ⁴-17β-methyl-18-nor-17α-pregnene-13α,21-oxido-11β-ol-3,20-dione, of the following properties: M.P. about 252–254° (dec.); $[\alpha]_D^{23} +49°$ (c., 0.51 in $CHCl_3$);

$\lambda_{max.}^{alc.}$ 237 m$\mu$ (17,700); $\lambda_{max.}^{Nujol}$ 2.98, 5.70, 6.10, 6.18$\mu$

*Analysis.*—Calcd. for $C_{21}H_{27}O_4F$ (362.43): C, 69.61; H, 7.51; F, 5.37. Found: C, 69.46; H, 7.36; F, 5.12.

Similarly, by substituting an equivalent amount of 9α-fluoro-Δ¹,⁴-pregnadiene-17α,21-oxido-11β-ol-3,20-dione, 9α-chloro-Δ⁴-pregnene-17α,21-oxido-11β-ol-3,20-dione and 9α-chloro-Δ¹,⁴-pregnadiene-17α,21-oxido-11β-ol-3,20-dione for the 9α-fluoro-Δ⁴-pregnene-17α,21-oxido-11β-ol-3,20-dione in the procedure of Example 9, there is obtained 9α-fluoro-Δ¹,⁴-17β-methyl-17α-pregnadiene-13α,21-oxido-11β-ol-3,20-dione (XII), 9α-chloro-Δ⁴-17β-methyl-17α-pregnene-13α,21-oxido-11β-ol-3,20-dione (XIII) and 9α-chloro-Δ¹,⁴-17β-methyl-17α-pregnadiene-13α,21-oxido-11β-ol-3,20-dione (XIV), respectively.

EXAMPLE 10

*9α-fluoro-Δ⁴-17β-methyl-17α-pregnene-13α,21-oxido-3,11,20-trione (XV)*

To a solution of 69 mg. of 9α-fluoro-Δ⁴-17β-methyl-18-nor-17α-pregnene-13α,21-oxido-11β-ol-3,20-dione in 5 ml. of acetone is added with stirring 0.125 ml. of a solution containing 200 mg. of $CrO_3$ and 320 mg. of sulfuric acid in 1 ml. water. After 20 minutes, a few drops of alcohol are added and the acetone removed in vacuo. The residual suspension is extracted with chloroform, the chloroform extract washed with water, dilute sodium bicarbonate and again with water, dried over sodium sulfate and the solvent removed in vacuo. The residue, after recrystallization from aceone, represents pure 9α-fluoro-Δ⁴-17β-methyl-17α-pregnene-13α,21-oxido-3,11,20-trione of the following properties: M.P. about 226–228°; $[\alpha]_D^{23} -18°$ (c., 0.81 in $CHCl_3$);

$\lambda_{max.}^{alc.}$ 235 m$\mu$ (17,100); $\lambda_{max.}^{Nujol}$ no OH, 5.69, 5.76, 5.94, 6.16$\mu$

*Analysis.*—Calcd. for $C_{21}H_{25}O_4F$ (360.41): C, 69.98; H, 6.99. Found: C, 69.96; H, 7.07.

In a similar manner, by substituting 9α-fluoro-Δ¹,⁴-17β-methyl-17α-pregnadiene-13α,21-oxido-11β-ol-3,20-dione 9α-chloro-Δ⁴-17β-methyl-17α-pregnene-13α,21-oxido-11β-ol-3,20-dione and 9α-chloro-Δ¹,⁴-17β-methyl-17α-pregnadiene-13α,21-oxido-11β-ol-3,20-dione for the 9α-fluoro compound in the procedure of Example 10, there is obtained 9α-fluoro-Δ¹,⁴-17β-methyl-17α-pregnadiene-13α,21-oxido-3,11,20-trione (XVI), 9α-chloro-Δ⁴-17β-methyl-17α-pregnene-13α,21-oxido-3,11,20-trione (XVII) and 9α-chloro-Δ¹,⁴-17β-methyl-17α-pregnadiene-13α,21-oxido-3,11,20-trione (XVIII), respectively.

EXAMPLE 11

*9α-fluoro-Δ⁴,¹³-17β-methyl-18-nor-17α-pregnadiene-11β,21-diol-3,20-dione (XIX)*

Into a solution of 170 mg. of 9α-fluoro-Δ⁴-pregnene-17α, 21-oxido-11β-ol-3,20-dione in 19 ml. of chloroform and 1 ml. of absolute alcohol is passed at 0° with stirring hydrogen fluoride gas until two layers develop (2 minutes). The resulting mixture is allowed to remain at 0° for 2 hours and is then neutralized by the addition of an aqueous suspension of sodium bicarbonate. The layers are separated and the chloroform phase washed with water, dried over sodium sulfate and evaporated to dryness in vacuo. The residue (about 190 mg.) is dissolved in 1 mil. chloroform and 8 ml. benzene and chromatographed on 4 g. of acid-washed alumina. Elution with chloroform-benzene (1:4) (300 ml.) gives a non-crystalline material, which is followed by a band of crystalline material (about 75 mg.) when the above eluant is replaced by chloroform-benzene (1:1) (600 mil.). Crystallization of this material from acetone-hexane gives pure 9α-fluoro-Δ⁴,¹³-17β-methyl-17α-pregnadiene-11β,21-diol-3,20-dione of the following properties: M.P. about 181–182°; $[\alpha]_D^{23} +195°$ (c., 1.28 in $CHCl_3$);

$\lambda_{max.}^{alc.}$ 235 m$\mu$ (17,700); $\lambda_{max.}^{Nujol}$ 2.96, 5.86, 6.17$\mu$

*Analysis.*—Calcd. for $C_{21}H_{27}O_4F$ (362.43): C, 69.61; H, 7.51; F, 5.37. Found: C, 69.77; H, 7.60; F, 5.22.

When the above reaction is terminated after 30 minutes, Compound XI could be isolated as the major product.

Similarly, by substituting an equivalent amount of Compounds IV through VI for the 9α-fluoro-Δ⁴-17β-methyl-17α-pregnene-17α,21-oxido-11β-ol-3,20-dione in Example 11, there is obtained 9a-fluoro-Δ¹,⁴,¹³-17β-methyl-17α-pregnatriene - 11β,21 - diol - 3,20 - dione (XX), 9α-chloro-Δ⁴,¹³-17β-methyl-17α-pregnadiene-11β,21-diol-3,20 - dione (XXI) and 9α-chloro-Δ¹,⁴,¹³-17β-methyl-17α-pregnatriene-11β,21-diol-3,20-dione (XXII), respectively.

These Δ¹³-steroids can also be prepared from the 13α,21-epoxides (Compounds XI through XIV), as illustrated by the following example:

EXAMPLE 12

*9α-fluoro-Δ⁴,¹³-17β-methyl-17α-pregnadiene-11β,21-diol-3,20-dione (XIX)*

A solution of 200 mg. of 9α-fluoro-Δ⁴-17β-methyl-18-nor-17α-pregnene-13α,21-oxido-11β-ol-3,20-dione in 19 ml. of chloroform and 1 ml. of alcohol is treated with hydrogen fluoride, as described in Example 11. The reaction mixture, upon chromatography and crystallization from acetone-hexane, furnishes pure 9α-fluoro-Δ⁴,¹³-17β-methyl-17α-pregnadiene-11β,21-diol-3,20 - dione, identical in all respects with a specimen prepared by the procedure of Example 11.

Furthermore, Compounds XIX through XXII can be esterified by procedures illustrated in the following two examples:

EXAMPLE 13

*9α-fluoro-Δ⁴,¹³-17β-methyl-17α-pregnadiene-11β,21-diol-3,20-dione 21-acetate (XXVII)*

50 mg. of 9α-fluoro-Δ⁴,¹³-17β-methyl-17α-pregnadiene-11β,21-diol-3,20-dione is dissolved in 0.786 ml. of pyridine containing 16.89 mg. of acetic anhydride, and the solution is allowed to remain at room temperature for 16 hours. The reagents are removed in vacuo and the residue consisting of the 21-monoacetate of 9α-fluoro-Δ⁴,¹³-17β-methyl-18-nor-17α-pregnadiene-11β,21-diol-3,20-dione is crystallized from acetone-hexane.

EXAMPLE 14

*9α-fluoro-Δ⁴,¹³-17β-methyl-17α-pregnadiene-11β, 21-diol-3,20-dione 11β,21-diacetate (XXVIII)*

A solution of 9α-fluoro-Δ⁴,¹³-17β-methyl-17α-pregnadiene-11β,21-diol-3,20-dione in 0.5 ml. of pyridine and 0.5 ml. of acetic anhydride is allowed to stand at room temperature for 18 hours. Removal of the reagents in vacuo leaves a crystalline residue, which is recrystallized from acetone-hexane. The pure 11β,21-diacetate has the following properties: M.P. about 118–120° after melting at about 98–100° and resolidification; $[\alpha]_D^{23} +202°$ (c., 0.89 in $CHCl_3$);

$\lambda_{max.}^{Nujol}$ no OH, 5.72, 5.80, 6.01, 6.17

*Analysis.*—Calcd. for $C_{25}H_{31}O_6F$ (446.50): C, 67.23; H, 6.99. Found: C, 67.25; H, 7.05.

The monoacetate formed in Example 13 can be oxidized to the corresponding 11-ketone, as illustrated by the following example:

EXAMPLE 15

*9α-fluoro-Δ⁴,¹³-17β-methyl-17α-pregnadiene-21-ol-3,11,20-trione 21-acetate (XXIII)*

To a solution of 40 mg. of 9α-fluoro-Δ⁴,¹³-17β-methyl-17α-pregnadiene-11β,21-diol-3,20-dione 21-acetate in 0.5 ml. of pyridine is added a suspension of 40 mg. of chromic acid in 0.5 ml. of pyridine. Eighteen hours later, water is added, and the mixture is extracted with chloroform, the chloroform solution throughly washed with water and the solvent removed in vacuo. The residue, upon recrystallization from acetone-hexane, furnishes 9α-fluoro-Δ⁴,¹³-17β-methyl-17α - pregnadiene-21-ol-3,11,20-trione 21-acetate.

This ester can be saponified in the usual manner, as by treatment with potassium carbonate in methanol, to yield the free 21-hydroxy steroid.

In a similar manner, the 21-monoacetates of 9α-fluoro-Δ¹,⁴,¹³-17β-methyl-17α - pregnatriene - 11β,21 - diol - 3,20-dione, 9α-chloro-Δ⁴,¹³-17β-methyl-17α - pregnadiene - 11β, 21-diol-3,20-dione and 9α-chloro-Δ¹,⁴,¹³-17β-methyl-17α-pregnatriene-11β,21-diol-3,20-dione can be oxidized to the 21-acetates of 9α-fluoro-Δ¹,⁴,¹³-17β-methyl-17α-pregnatriene-21-ol-3,11,20-trione (XXIV), 9α-chloro - Δ⁴,¹³-17β-methyl-17α-pregnadiene-21-ol-3,11,20-trione (XXV) and 9α-chloro-Δ¹,⁴,¹³-17β-methyl-17α-pregnatriene-21-ol- 3,11, 20-trione (XXVI), respectively.

The invention may be otherwise variously embodied within the scope of the appended claims.

We claim:

1. A compound selected from the group consisting of Δ⁴-pregnene-9β, 11β;17α,21-dioxido - 3,20 - dione and Δ¹,⁴-pregnadiene-9β,11β;17α,21-dioxido-3,20-dione.

2. A compound selected from the group consisting of steroids of the general formulae

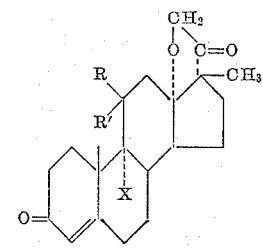

and

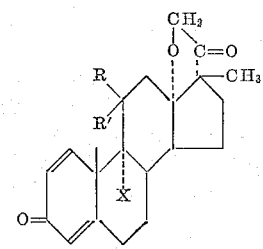

wherein R is hydrogen, R' is β-hydroxy and together R and R' is keto, and X is α-halogen.

3. 9α-fluoro-Δ⁴-17β-methyl-17α-pregnene - 13α, 21-oxido-11β-ol-3,20-dione.

4. A compound selected from the group consisting of steroids of the general formulae

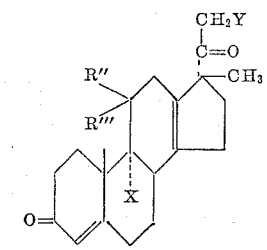

and

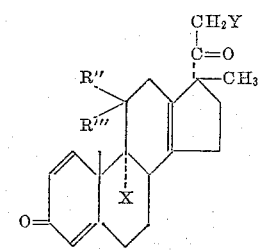

wherein R″ is hydrogen, R‴ is selected from the group consisting of β-hydroxy and β-acyloxy, and together R'' and R''' is keto, X is α-halogen, and Y is selected from the group consisting of hydroxy and acyloxy, the acyloxy radical in both instances being the acyloxy radical of a hydrocarbon carboxylic acid having less then ten carbon atoms.

5. 9α-fluoro-Δ$^{4,13}$-17β-methyl-17α-pregnadiene-11β,21-diol-3,20-dione.

6. A process for preparing 9α-fluoro-Δ$^4$-17β-methyl-17α-pregnene-13α,21-oxido-11β-ol-3,20-dione, which comprises heating 9α-fluoro-Δ$^4$-pregnene-17α,21-oxido-11β-ol-3,20-dione with a dilute acid.

7. The process of claim 6, wherein the acid is sulfuric acid.

8. A process for preparing 9α-fluoro-Δ$^{4,13}$-17β-methyl-17α-pregnadiene-11β,21-diol-3,20-dione, which comprises treating a compound selected from the group consisting of 9α-fluoro-Δ$^4$-pregnene-17α,21-oxido-11β-ol-3,20-dione and 9α-fluoro-Δ$^4$-17β-methyl-17α-pregnene-13α,21-oxido-11β-ol-3,20-dione with hydrofluoric acid.

9. A process which comprises interacting a 21-organic sulfonic acid ester of a steroid selected from the group consisting of 9β,11β-epoxy-Δ$^4$-pregnane-17α,21-diol-3,20-dione and 9β,11β-epoxy-Δ$^{1,4}$-pregnadiene-17α,21-diol-3,20-dione with potassium fluoride and recovering the corresponding steroid selected from the group consisting of Δ$^4$-pregnene-9β,11β;17α,21-dioxido-3,20-dione and Δ$^{1,4}$-pregnadiene-9β,11β;17α,21-dioxido-3,20-dione.

10. A process which comprises interacting a steroid selected from the group consisting of Δ$^4$-pregnene-9β,11β;-17α,21-dioxido-3,20-dione and Δ$^{1,4}$-pregnadiene-9β,11β;-17α,21-dioxide-3,20-dione with hydrogen halide and recovering the corresponding steroid selected from the group consisting of 9α-halo-Δ$^4$-pregnene-17α,21-oxido-11β-ol-3,20-dione and 9α-halo-Δ$^{1,4}$-pregnadiene-17α,21-oxido-11β-ol-3,20-dione.

11. The process of claim 10, wherein the hydrogen halide is hydrogen chloride.

12. A process which comprises interacting 9α-fluorohydrocortisone 21-mesylate with potassium fluoride and recovering 9α-fluoro-Δ$^4$-pregnene-17α,21-oxido-11β-ol-3,20-dione.

13. A process which comprises interacting 9α-fluoro-Δ$^{1,4}$-pregnadiene-11β,17α,21-triol-3,20-dione 21-mesylate with potassium fluoride and recovering 9α-fluoro-Δ$^{1,4}$-pregnadiene-17α,21-oxido-11β-ol-3,20-dione.

14. A process which comprises interacting a steroid selected from the group consisting of 9α-halo-Δ$^4$-pregnene-17α-21-oxido-11β-ol-3,20-dione and 9α-halo-Δ$^{1,4}$-pregnadiene-17α,21-oxido-11β-ol-3,20-dione with an acid and recovering the corresponding steroid selected from the group consisting of 9α-halo-Δ$^4$-17β-methyl-17α-pregnene-13α,21-oxido-11β-ol-3,20-dione and 9α-halo-Δ$^{1,4}$-17β-methyl-17α-pregnadiene-13α,21-oxido-11β-ol-3,20-dione.

15. A process which comprises treating a steriod selected from the group consisting of 9α-halo-Δ$^4$-17β-methyl-17α-pregnene-13α,21-oxido-11β-ol-3,20-dione and 9α-halo-Δ$^{1,4}$-17β-methyl-17α-pregnadiene-13α,21-oxido-11β-ol-3,20-dione with hydrofluoric acid and recovering the corresponding steroid selected from the group consisting of 9α-halo-Δ$^{4,13}$-17β-methyl-17α-pregnadiene-11β,21-diol-3,20-dione and 9α-halo-Δ$^{1,4,13}$-17β-methyl-17α-pregnatriene-11β,21-diol-3,20-dione.

16. A process which comprises treating a steriod selected from the group consisting of 9α-halo-Δ$^4$-pregnene-17α,21-oxido-11β-ol-3,20-dione and 9α-halo-Δ$^{1,4}$-pregnadiene-17α,21-oxido-11β-ol-3,20-dione with hydrofluoric acid and recovering the corresponding steroid selected from the group consisting of 9α-halo-Δ$^{4,13}$-17β-methyl-17α-pregnatriene-11β,21-diol-3,20-dione, and 9α-halo-Δ$^{1,4,13}$-17β-methyl-17α-pregnatriene-11β,21-diol-3,20-dione.

References Cited in the file of this patent

UNITED STATES PATENTS

| 2,865,915 | Bailey et al. | Dec. 23, 1958 |
| 2,932,640 | Bailey et al. | Apr. 12, 1960 |

OTHER REFERENCES

Herz et al.: J. Am. Chem. Soc., vol. 78 (Sept. 20, 1956), pages 4812–4814.

Hirschmann et al.: J. Am. Chem. Soc., vol. 78 (Sept 20, 1956), page 4814.

UNITED STATES PATENT OFFICE
CERTIFICATION OF CORRECTION

Patent No. 3,007,925            November 7, 1961

Josef Fried et al.

It is hereby certified that error appears in the above numbered patent requiring correction and that the said Letters Patent should read as corrected below.

Column 3, the third formula should appear as follows instead of as in the patent:

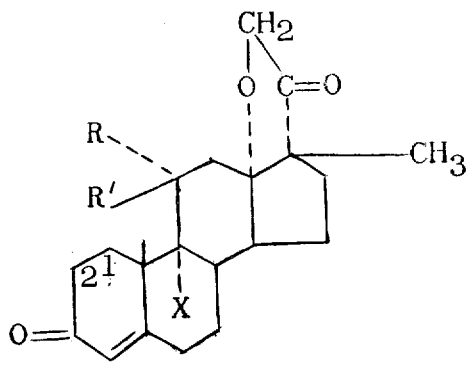

column 11, line 32, for "dioxide" read -- dioxido --.

Signed and sealed this 29th day of May 1962.

(SEAL)
Attest:

ERNEST W. SWIDER            DAVID L. LADD

Attesting Officer            Commissioner of Patents